United States Patent [19]
Udagawa

[11] Patent Number: 5,853,175
[45] Date of Patent: Dec. 29, 1998

[54] CYLINDER HEAD GASKET WITH FLUID FLOW PATH

[75] Inventor: Tsunekazu Udagawa, Ichikawa, Japan

[73] Assignee: Ishikawa Gasket Co., Ltd., Tokyo, Japan

[21] Appl. No.: 723,551

[22] Filed: Sep. 30, 1996

[51] Int. Cl.$^6$ ......................................... F16J 15/12
[52] U.S. Cl. ......................................... 277/235 B; 277/70
[58] Field of Search .................. 277/235 B, 70, 277/75, 180, 236, 22

[56] References Cited

U.S. PATENT DOCUMENTS

| | | | |
|---|---|---|---|
| 5,110,630 | 5/1992 | Abe et al. | 277/235 B |
| 5,213,344 | 5/1993 | Udagawa | 277/235 B |
| 5,267,740 | 12/1993 | Stritzke | 277/235 B |
| 5,332,237 | 7/1994 | Hagiwara | 277/235 B |
| 5,435,575 | 7/1995 | Udagawa | 277/235 B |
| 5,540,452 | 7/1996 | Belter | 277/235 B |
| 5,575,245 | 11/1996 | Watanabe | 277/235 B |
| 5,584,490 | 12/1996 | Inoue et al. | 277/235 B |

Primary Examiner—Daniel G. DePumpo
Attorney, Agent, or Firm—Kanesaka & Takeuchi

[57] ABSTRACT

A cylinder head gasket for an internal combustion engine of the invention is formed of at least one metal plate for constituting the cylinder head gasket. The gasket includes a cooling fluid path formed in the metal plate, which extends laterally for a predetermined distance. The cooling fluid path communicates with a circulation passage in the engine so that a cooling fluid flowing through the circulation passage enters into the cooling fluid path and cools the engine. Accordingly, a high temperature portion of the engine away from the circulation passage of the engine can be cooling efficiently.

12 Claims, 1 Drawing Sheet

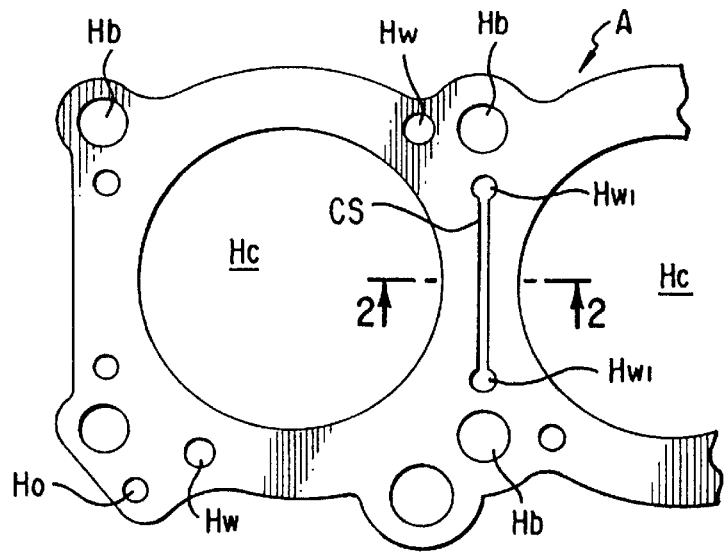
FIG. 1
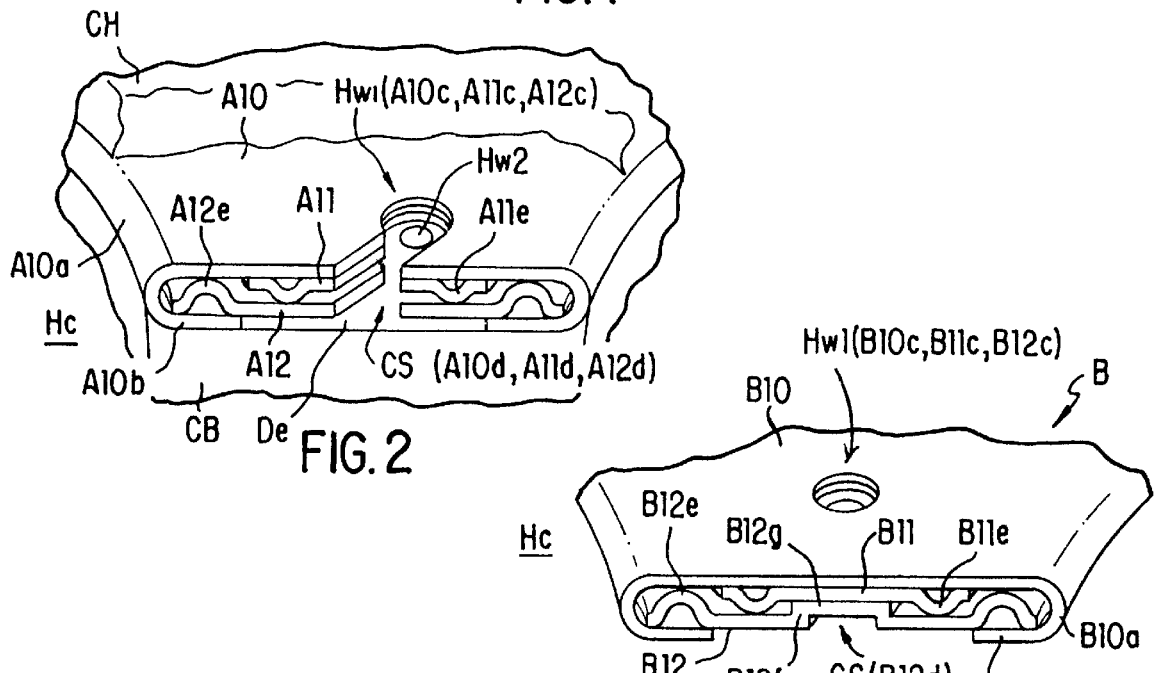
FIG. 2
FIG. 3
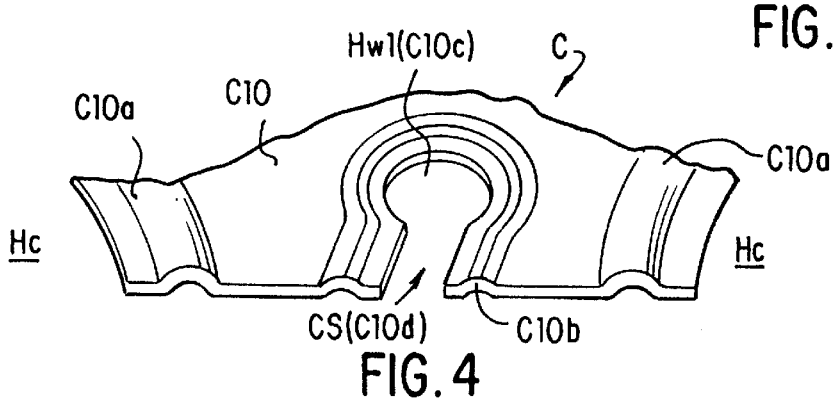
FIG. 4

CYLINDER HEAD GASKET WITH FLUID FLOW PATH

BACKGROUND OF THE INVENTION AND RELATED ART STATEMENT

The present invention relates to a cylinder head gasket for an internal combustion engine having a fluid flow path therein.

In an internal combustion engine cooled by water or fluid, a cooling fluid circulation passage, such as fluid holes or paths, is formed inside a cylinder head and a cylinder block, and fluid is circulated through the paths to cool the cylinder head and the cylinder block. Generally, the fluid paths are formed to surround the cylinder bores where heat is generated. However, in the engine, bolt holes are also arranged to tightly connect the cylinder head and the cylinder block with an even pressure. In addition, intake and exhaust valves, spark plugs and so on are attached to the cylinder head.

In designing the engine, the size and location of the water holes are determined with reference to other structure and arrangement on the cylinder head and cylinder block, such as intake and exhaust valves, spark plugs and so on. In some cases, the water holes may not be located in ideal locations to properly cool the engine.

On the other hand, the engine has portions where high temperature is locally formed, such as near the exhaust pipes and exhaust valves. Also, temperature is generally high between the cylinder bores. If temperature is locally high, a gasket situated near the high temperature portion may be damaged, and sealing can not be made as intended.

It is desirable to cool the high temperature portion of the engine. However, re-arrangement of the water holes in the engine is troublesome, and it costs too much. Therefore, it has been desired to locally cool the engine without re-arrangement of the water holes.

Accordingly, one object of the invention is to provide a metal gasket for a cylinder head, which can help cooling of a part of an engine to prevent damages of the engine and gasket by heat.

Another object of the invention is to provide a metal gasket as stated above, wherein a desired part of the engine is cooled by using a cooling water or liquid for the engine.

A further object of the invention is to provide a metal gasket as stated above, wherein a cooling system is easily formed in the gasket.

Further objects and advantages of the invention will be apparent from the following description of the invention.

SUMMARY OF THE INVENTION

The cylinder head gasket of the invention is used for an internal combustion engine to be cooled by cooling liquid or water. The engine includes a cooling fluid circulation passage, through which the cooling liquid is circulated to cool the same. The circulation passage may be a water jacket situated outside cylinder bores for an open deck type engine, or water holes or paths for a regular type engine.

The gasket is formed of a first metal plate extending substantially throughout an entire area of the engine to be sealed for constituting the cylinder head gasket, and a cooling fluid path formed in the first metal plate and laterally extending for a predetermined distance. In particular, the cooling fluid path formed in the first metal plate has a portion, at which the gasket is directly sandwiched between a cylinder head and a cylinder block. The cooling fluid path communicates with the circulation passage in the engine, so that a cooling fluid flowing through the circulation passage enters into the cooling fluid path and cools the engine.

In the invention, even if the circulation passage, such as water holes or paths, is not formed in the cylinder head and the cylinder block, the cooling fluid can pass through the fluid path formed in the gasket, so that the gasket and the area of the engine around the fluid path can be cooled. As a result, local high temperature ares of the engine and the gasket can be properly cooled by the fluid passing through the fluid path of the gasket.

In the invention, since the water holes need not be newly formed or re-arranged after the cylinder head and the cylinder block are formed, the temperature control of the engine can be easily made. Also, since the heated part in the engine is the cylinder head, it is easy to cool the engine by the fluid passing through the fluid path in the cylinder head gasket.

The fluid path may be provided at high temperature portions, such as an intermediate portion between the two adjacent cylinder bores and under exhaust valves and exhaust pipe of the engine. In the invention, since the high temperature portions of the cylinder head are cooled, the gasket situated under the cylinder head is protected from high temperature. In case a bead is formed on the metal plate, the bead may be damaged by high temperature. Namely, creep relaxation may occur at the bead. In the invention, the creep relaxation of the bead by high temperature is prevented. Also, in case a coating layer is formed on the metal plate, flow of the coating layer may occur by high temperature. In the invention, flow of the coating layer is also prevented.

The gasket further includes first sealing means for sealing around the cylinder bore. The first sealing means also prevents the cooling fluid from entering into the cylinder bore when the cooling fluid contacts the first sealing means. Also, the gasket may further include second sealing means situated around the cooling fluid path for sealing the same.

In the invention, the circulation passage formed in the engine may be formed of at least two water holes. In this case, the cooling fluid path formed in the first metal plate includes two fluid holes communicating with the at least two water holes of the engine.

The cooling fluid path formed in the first metal plate may be a slit, and the second sealing means may be a bead surrounding the two fluid holes and the cooling fluid path. The bead can seal around the fluid holes and the cooling fluid path between the cylinder head and the cylinder block. In case a second metal plate is laminated on the first metal plate, the second metal plate may have additional fluid holes and an additional fluid path corresponding to those in the first metal plate. The bead surrounding the fluid holes and the cooling fluid path may be formed on the second metal plate.

In the invention, the cooling fluid path may be a dent formed in the first metal plate and surrounded by side walls, and a second metal plate may be laminated on the first metal plate. The second metal plate may have additional fluid holes and a bead surrounding the fluid holes and the fluid path to seal the same.

BRIEF DESCRIPTION OF THE DRAWINGS

FIG. 1 is a plan view of a part of a first embodiment of a metal laminate type cylinder head gasket of the present invention;

FIG. 2 is an enlarged sectional view taken along line 2—2 in FIG. 1;

FIG. 3 is a sectional view, similar to FIG. 2, of a second embodiment of the metal laminate type cylinder head gasket of the invention; and FIG. 4 is a sectional view, similar to FIG. 2, of a third embodiment of a metal gasket of the invention.

DETAILED DESCRIPTION OF PREFERRED EMBODIMENTS

With reference to FIGS. 1 and 2, a first embodiment A of a metal laminate type cylinder head gasket of the invention is shown. The gasket A includes a plurality of cylinder bores Hc, water holes Hw, Hw1, oil holes Ho, bolt holes Hb, as in the conventional gasket. Since the invention is directed to a cooling system CS associated with the water holes Hw1, the cooling system CS and its vicinity or associated structure are explained. The rest of the structure is not explained, but any structure may be used.

The gasket A is formed of metal plates, i.e. an upper plate A10, a middle plate A11 situated under the upper plate A10, and a lower plate A12 situated under the middle plate A11. The plates A10, A11, A12 extend substantially throughout an entire area to be sealed between a cylinder head CH and a cylinder block CB.

The upper plate A10 includes curved portions A10a for defining the cylinder bores Hc, and flanges A10b extending from the respective curved portions A10a. Also, the upper plate A10 includes water holes A10c for the water holes Hw1, and a slit A10d between the two water holes A10c for the cooling system CS.

The middle plate A11 includes holes for the cylinder bores Hc, water holes A11c for the water holes Hw1 and a slit A11d between the water holes A11c for the cooling system CS. Also, a bead A11e is formed on the middle plate A11 to completely surround the water holes A11c and the slit A11d.

The lower plate A12 includes holes for the cylinder bores Hc, water holes A12c for the water holes Hw1 and a slit A12d between the water holes A12c for the cooling system CS. Also, beads A12e are formed to completely surround the holes for the cylinder bores Hc. The beads A12e are located above the flanges A10b to provide surface pressure when the gasket A is tightened.

In the gasket A, the water holes Hw1 are located in an intermediate area between the two cylinder bores Hc to be spaced apart from each other, i.e. upper and lower portions in the intermediate area in FIG. 1. The slits A10d, A11d, A12d for the cooling system CS extend between the water holes Hw1.

When the gasket A thus formed is installed between the cylinder head and the cylinder block and is tightened, the beads A11e, A12e are compressed to provide surface pressures thereat. The bead A11e seals around the water holes Hw1 and the cooling system CS, while the beads A12e seal around the cylinder bores Hc.

When the engine is actuated, high temperature and high pressure are applied to the cylinder head, especially to the intermediate areas between the cylinder bores Hc. Also, the intermediate area between the cylinder bores Hc is heated extremely. Therefore, the intermediate areas of the cylinder head and the gasket are especially heated, and the areas around the exhaust valves are also very heated, as well.

In the gasket A, since the cooling system or slits A10d, A11d, A12d are formed between the water holes Hw1, when the engine is actuated, water in a cooling fluid circulation passage Hw2 in the engine passes through the water holes Hw1, and enters and flows through the cooling system CS on deck portions De of the engine. Thus, the gasket between the cylinder bores Hc as well as the intermediate area of the cylinder head are cooled by water, so that the portions of the engine and the gasket which are extremely heated are properly cooled. The load by heat applied to the gasket and the engine is reduced.

In the engine, when a water hole is formed in the central area between the cylinder bores, the thickness between the cylinder bores must be increased. In the invention, the water holes can be located at the widest portions in the intermediate area between the cylinder bores Hc, while the intermediate area is entirely cooled by the cooling system CS. Thus, in the invention, the thickness between the cylinder bores need not be increased, but the intermediate area can be properly cooled.

The cooling system CS or slits A10d, A11d, A12d may be branched off from the circulating paths of the engine, so that water is not forcibly passed through the cooling system CS. On the other hand, the cooling system CS or slits A10d, A11d, A12d may be a part of the circulating paths of the engine, so that water is forcibly passed through the cooling system CS.

FIG. 3 is a second embodiment B of a metal laminate type cylinder head gasket. The gasket B comprises an upper plate B10 having curved portions B10a, flanges B10b and water holes B10c; a middle plate B11 having water holes B11c and a bead B11e; and a lower plate B12 having water holes B12c and beads B12e, as in the gasket A.

In the gasket A, the slits A10d, A11d, Al2d are formed in the intermediate area between the cylinder bores Hc, but in the gasket B, there are no slits in the plates B10, B11, B12. Instead, the plate B12 includes a dent B12d as the cooling system CS, which is surrounded by side walls B12f and a top portion Bl2g. The dent Bl2d extends linearly to permit communication between the water holes Bl2c.

The bead B11e formed on the middle plate B11 is located outside the side walls B12f to surround the dent B12d and the two water holes B12c. When the gasket B is tightened, the bead B11e securely seals around the dent Bl2d and the water holes B12c.

In the gasket B, the side walls Bl2f only define the dent Bl2d. However, the side walls Bl2f may extend to completely surround both the water holes B12c and the dent B12d. As a result, the side walls can completely seal the cooling system Cs. In the gasket B, the size of the dent B12d is small, but the cooling system Cs operates as in the gasket A.

FIG. 4 is a third embodiment C of a cylinder head gasket of the invention. The gasket C is formed of one metal plate C10, and includes holes for the cylinder bores Hc, water holes C10c (Hw1) and a slit C10d (CS). The slit C10d connects the two water holes Hw1 together. Beads C10a are formed around the cylinder bores Hc, and a bead C10b completely surrounds the water holes C10c and the slit C10d.

When the gasket C is situated between the cylinder head and the cylinder block and is tightened, the beads C10a, C10b are compressed to securely seal around the cylinder bores Hc, and the water holes Hw1 and the slit C10d. Water flows through the slit Clod between the water holes Hw1 and cools the intermediate area of the gasket between the cylinder bores. The gasket C operates as in the gasket A.

In the above embodiments, the slit or the cooling system CS is located at the intermediate area between the cylinder bores. However, the cooling system CS may be formed among two or more water holes Hw at local high temperature portions, such as exhaust valve and exhaust pipe. In the invention, the cooling system CS can be easily formed on the gasket, by which the local high temperature portions of the gasket and engine can be effectively cooled.

Also, in the above embodiments, the engine that the gasket is installed is a regular type, but the gasket may be used for an open deck type engine. In this case, the cooling system CS formed in the gasket may communicate with a water jacket formed around the cylinder bores of the engine. Also, the gasket has sealing means around the cylinder bores and outside the water jacket, as in the conventional gasket.

While the invention has been explained with reference to the specific embodiments of the invention, the explanation is illustrative and the invention is limited only by the appended claims.

What is claimed is:

1. A cylinder head gasket for an internal combustion engine having a cooling fluid circulation passage therein, comprising:

a first metal plate extending substantially throughout an entire area of the engine to be sealed for constituting the cylinder head gasket, said first metal plate having at least two cylinder bores, at least one intermediate portion between the at least two cylinder bores situated adjacent to each other, and at least two fluid holes located in the at least one intermediate portion, and a cooling fluid path formed in the at least one intermediate portion in the first metal plate and laterally extending between the at least two fluid holes, said cooling fluid path being adapted to communicate with a circulation passage in the engine so that a cooling fluid flowing through the circulation passage enters into the cooling fluid path in the first metal plate and cools the engine.

2. A cylinder head gasket according to claim 1, further comprising first sealing means for sealing around the at least two cylinder bores, said first sealing means being adapted to prevent the cooling fluid from entering into the cylinder bores when the cooling fluid contacts the first sealing means.

3. A cylinder head gasket according to claim 2, wherein said cooling fluid path formed in the first metal plate has a portion adapted to directly contact at least one of a cylinder head and a cylinder block.

4. A cylinder head gasket according to claim 3, further comprising second sealing means formed on the first metal plate and situated around the cooling fluid path for sealing the same.

5. A cylinder head gasket according to claim 4, wherein said cooling fluid path includes a slit between the two fluid holes, and said second sealing means is a bead surrounding the at least two fluid holes and the slit.

6. A cylinder head gasket according to claim 5, further comprising a second metal plate laminated on the first metal plate, said second metal plate having additional fluid holes corresponding to and situated on the fluid holes of the first metal plate and an additional slit between the additional fluid holes as an additional cooling fluid path situated on the slit in the first metal plate.

7. A combination of a cylinder head gasket and an internal combustion engine, said engine including at least two fluid holes, deck portion between the at least two fluid holes, and a cooling fluid circulation passage communicating with the at least two fluid holes, and said cylinder head gasket including a first metal plate extending substantially throughout an entire area of the engine to be sealed for constituting the cylinder head gasket; at least two water holes formed in the first metal plate and communicating with the at least two fluid holes of the engine; and a slit formed in the first metal plate between the at least two water holes, said slit communicating with the circulation passage in the engine so that a cooling fluid flowing through the circulation passage enters into the slit of the first metal plate and cools the deck portions of the engine.

8. A combination according to claim 7, wherein said cylinder head gasket further includes a bead formed in the first metal plate, said bead surrounding the at least two water holes and the slit to seal the at least two water holes and the slit.

9. A combination according to claim 8, wherein said cylinder head gasket further includes a second metal plate laminated on the first metal plate, said second metal plate having additional fluid holes corresponding to and situated on the fluid holes of the first metal plate and an additional slit between the additional fluid holes situated on the slit in the first metal plate.

10. A cylinder head gasket for an internal combustion engine having a cooling fluid circulation passage therein, comprising:

a first metal plate extending substantially throughout an entire area of the engine to be sealed for constituting the cylinder head gasket, and having at least two fluid holes spaced apart from each other, and a cooling fluid path formed in the first metal plate between the at least two fluid holes, said cooling fluid path having a top portion and two side walls situated on two lateral sides of the top portion to thereby form a dent between the side walls, said dent being adapted to communicate with the circulation passage in the engine so that a cooling fluid flowing through the circulation passage enters into the cooling fluid path and cools the engine.

11. A cylinder head gasket according to claim 10, further comprising a second metal plate laminated on the first metal plate, said second metal plate having additional fluid holes corresponding to and situated on the fluid holes of the first metal plate.

12. A cylinder head gasket according to claim 11, wherein said second metal plate further includes a bead surrounding the fluid holes and the fluid path to seal the same.

* * * * *